April 26, 1960
J. MERCIER
2,934,332
SHOCK ABSORBER
Filed June 14, 1955
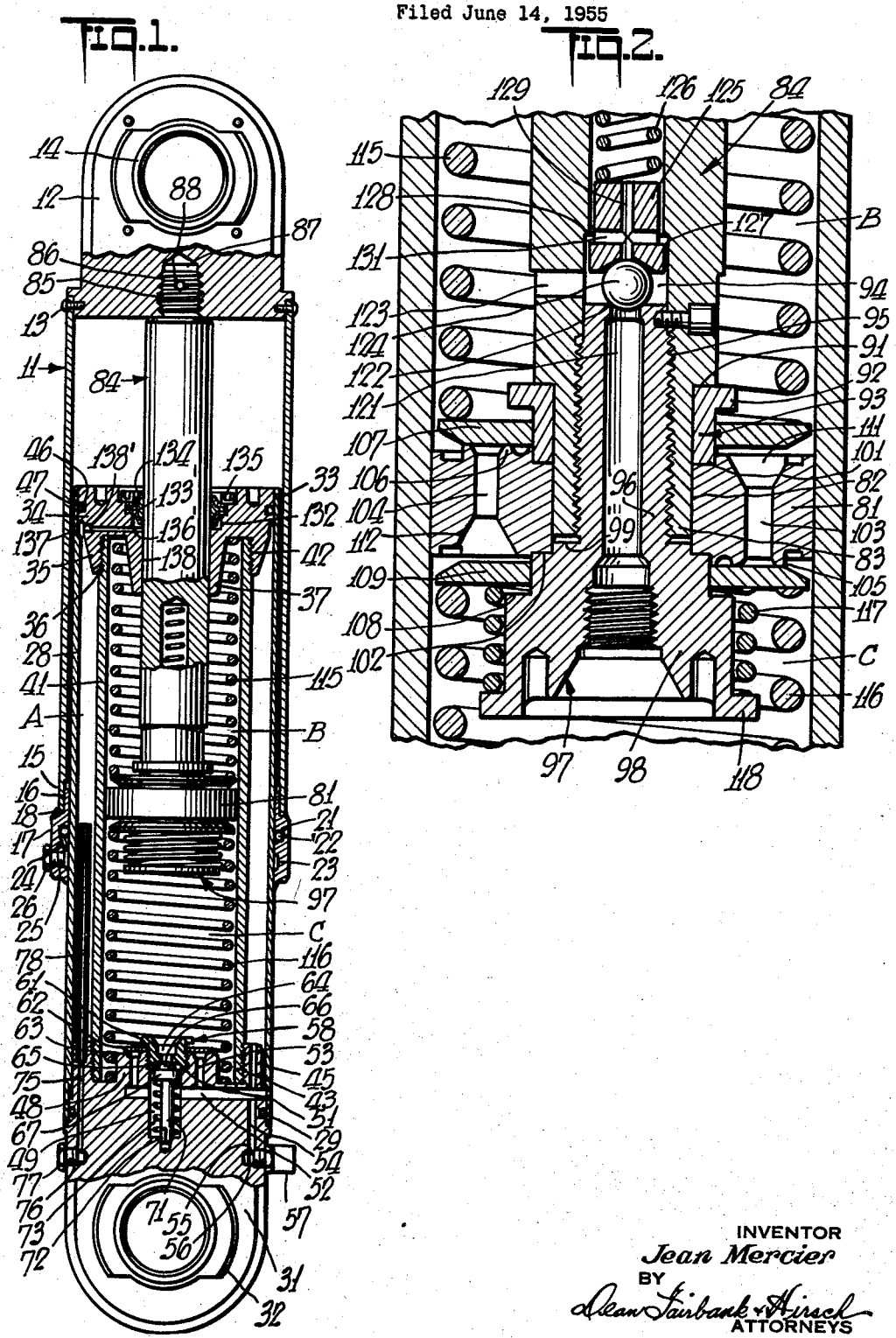
INVENTOR
*Jean Mercier*
BY
*Dean Fairbank + Hirsch*
ATTORNEYS United States Patent Office 2,934,332
Patented Apr. 26, 1960

2,934,332

SHOCK ABSORBER

Jean Mercier, New York, N.Y.

Application June 14, 1955, Serial No. 515,475

13 Claims. (Cl. 267—8)

This invention relates to the art of shock absorbers, more particularly of the hydraulic type.

In hydraulic shock absorbers of the type having an oil filled working cylinder in which a piston is slidably mounted and which has passageways therethrough having valves on each side of the piston subjected to the force exerted by associated springs alternately compressed and expanded by the action of the piston, where, when the piston is at or near its neutral position, the springs are relatively uncompressed, the shock absorber will be relatively ineffective in dampening oscillation of relatively small amplitude.

Where the piston of the shock absorber is subjected to a violent impact and moves downwardly into the working cylinder so rapidly that the pressure in the cylinder beneath the piston rises excessively, rupture of the working cylinder may occur.

It is accordingly among the objects of the invention to provide a shock absorber of the hydraulic type which is relatively simple in construction and which will dependably dampen oscillations which are both large and small in amplitude.

Another object is to provide a shock absorber of the above type which will, upon sudden violent impact, prevent excessive rise of pressure in the working cylinder thereof, thereby preventing rupture of the cylinder.

According to the invention these objects are accomplished by the arrangement and combination of elements hereinafter described and particularly recited in the claims.

In the accompanying drawings in which are shown one or more of various possible embodiments of the several features of the invention, Fig. 1 is a longitudinal sectional view of the shock absorber unit, and Fig. 2 is an enlarged detail view similar to Fig. 1 of a portion of the unit.

Referring now to the drawings, the shock absorber comprises an outer cylindrical casing 11 having a plug 12 fixed in one end thereof as by screws 13, said plug having a bushing 14 extending transversely therethrough.

The other end 15 of the casing 11 encompasses the reduced diameter portion 16 of a sleeve 17 to which it is affixed as by welding as at 18. Sleeve 17, which has an internal diameter slightly less than that of casing 11, has an internal annular groove 21 in which is positioned a resilient O ring seal 22. The groove 21 is in communication with an annular groove 23 by means of a passageway 24 and a port 25 leading into groove 23 is sealed by a plug 26. An inner cylindrical casing 28 is slidably mounted in sleeve 17 which defines a bearing for the casing 28, the latter extending into casing 11 with adjacent surfaces of said casings 11 and 28 being slightly spaced as shown. The seal 22 prevents material such as mud or dirt, scraped off the outer surface of casing 28 from entering the casing 11 and the port 25 and passageway 24 permits a lubricant such as grease to be forced into groove 23 so that the seal ring 22 may be lubricated.

The outer end 29 of casing 28 has a plug 31 positioned therein, said plug also having a bushing 32 extending transversely therethrough. Secured in the inner end 33 of the casing 28 is a plug 34 which has an annular rim 35 on its undersurface internally threaded as at 36. The rim 35 is radially spaced from a cylindrical extension 37 concentric with an axial bore 138 extending through plug 34. An elongated sleeve 41 externally threaded at one end as at 42 is screwed into the threaded rim 35. The other end 43 of the sleeve 41 is also externally threaded and screwed into the correspondingly threaded rim 45 desirably formed integral with the inner surface of plug 31.

To prevent leakage past the plugs 31 and 34 from the reservoir A defined between casng 28 and sleeve 41, the plugs 31 and 34 each has an annular groove 46 in which a resilient O ring seal 47 is positioned.

The rim 45 is radially spaced from an axial hub 48 desirably formed integral with plug 31 on the inner surface thereof. The hub 48 has an axial recess 49 therein of enlarged diameter near its inner end defining an annular shoulder 51. The plug 31 has a transverse passageway 52 in communication with the axial recess 49 and with a plurality of passageways 53 in said hub 48 extending parallel to the recess 49. The passageway 52 is also in communication with a passageway 54 extending through rim 45 and in communication at its end 55 with a charging port 56 leading to the exterior of the plug 31 and closed by a plug 57.

The enlarged inner end portion of axial recess 49 is internally threaded to receive the correspondingly threaded end of a plug 58, the latter having an annular flange 61 normally spaced from the inner end of the hub 48.

Encompassing plug 58 and having its inner periphery positioned between flange 61 and the adjacent surface of hub 48 is an annular valve member 62 which is designed to seat on the end of hub 48 to close the ends 63 of passageways 53. The plug 58 has an axial bore 64 therethrough of reduced diameter at the end thereof adjacent annular shoulder 51 to define a valve seat 65. A hemispherical ball valve 66 is affixed to a substantially triangular follower 67 which is guided by the wall of bore 49. The follower carries a stem 71 which has a triangular configuration 72 at its lower end, said stem being encompassed by a coil spring 73 normally to retain ball 66 on its seat 65. By reason of the triangular follower 67 and end 72 of the stem 71, a dash pot action is precluded.

The plug 31 has an additional passageway 75 extending through rim 45 parallel to the axis of the plug. One end of passageway 75 is in communication with a port 76 leading to the exterior and normally closed by a plug 77 and the other end of the passageway 75 has a tube 78 affixed therein and extending into reservoir A.

The sleeve 41 which is closed at its respective ends by plugs 31 and 34, defines a working cylinder in which a piston 81 is slidably mounted, the piston defining chambers B and C on each side respectively. The piston 81 has an axial bore 82 which encompasses the reduced diameter end 83 of a piston rod 84. The other end 85 of the piston rod 84 is externally threaded as at 86 and screwed into a correspondingly threaded socket 87 in the end plug 12, the end 85 being retained in said socket by a pin 88.

The reduced diameter end 83 of piston rod 84 defines an annular shoulder 91 against which is seated the lateral flange 92 of a sleeve 93 encompassing said reduced diameter end 83. The free end of piston rod 84 has an axial bore 94 internally threaded as at 95 at its extremity to receive the corresponding threaded stem 96 of a fitting 97. The fitting has an annular portion 98 from which the stem 96 extends and the portion 99 of the annular portion adjacent the root end of the stem defines an annular shoulder.

The periphery of the piston 81 is securely retained between the end 101 of sleeve 93 and an annular shoulder 102 also formed on annular portion 98. The piston 81 has a set of one-way downflow passageways 103 and staggered therewith a second set of upflow passageways 104. Each of the passageways 103 has an outstanding rim 105 on the undersurface of the piston and each of the passageways 104 has an outstanding rim 106 on the top surface of the piston.

Encompassing sleeve 93 between flange 92 and the top surface of the piston is an annular valve member 107 and encompassing annular portion 98 between a third annular shoulder 108 on said annular portion and the undersurface of the piston is a second annular valve member 109, said valve members controlling passageways 104 and 103 respectively.

With the construction of the piston and the associated valve members 107 and 109, it is apparent that when the valve member 107 is seated on rim 106 to close passageways 104, the ends 111 of passageways 103 will be open and similarly when the valve member 109 is retained against rim 105 of passageways 103 the ends 112 of passageways 104 will be open.

The valve member 107 is urged against the rim 106 by means of a coil spring 115 in chamber B encompassing the rod 84 and positioned between the valve member 107 and the plug 34. The spring 115 by its action against valve member 107 serves to control the flow of fluid through the upflow passageways 104 in the manner hereinafter to be described. The valve member 109 is urged against the rim 105 by means of a coil spring 116 in chamber C between valve member 109 and plug 31 and by a coil spring 117 positioned between valve member 109 and an annular flange 118 on annular portion 98 to control the flow of fluid through the downflow passageways 103 in the manner hereinafter to be described.

The stem 96 and annular portion 98 of fitting 97 have a longitudinal bore 121 therethrough and the inner end 122 of bore 121 which defines a valve seat is aligned with a transverse passageway 123 through rod 84 and provides communication through bore 121 between chambers B and C. A ball valve 124 is normally retained on seat 122 by means of a follower 125 urged against the ball by a coil spring 126.

The follower 125 is of reduced diameter at one end defining an annular shoulder 127 which may abut against an internal annular shoulder 128 in bore 94 to limit the movement of said follower. The follower has an axial bore 129 therethrough as well as a transverse bore 131 leading into said axial bore to prevent dash post action.

In the illustrative embodiment shown, the force required to open valve 124 against the tension of spring 126 is less than that required to open valve 66 against the tension of spring 73, to ensure that chamber B will fill on the compression or downward stroke of the piston 81.

To prevent leakage of fluid from chamber B past the piston rod 84, the axial bore 138 of plug 34 is of enlarged diameter as at 132 and a packing washer 133 is positioned in said enlarged diameter portion 132 encompassing the rod 84. Opposed surfaces of the washer 133 have resilient sealing strips 134 thereagainst and the washer and the sealing strips are retained in position by a ring member 135 screwed in the enlarged diameter portion 132 of plug 34.

The plug 34 has a transverse passageway 136 extending from the bore 38 to an annular groove 137 in communication with the reservoir A. The passageway 136 is of enlarged diameter at the portion thereof adjacent groove 137 defining a valve seat on which a ball valve 138' is seated so that fluid leaking from the chamber B may return into the reservoir A.

*Operation*

Except for the provision of the fitting 97, the spring 117 and valve 124 and the associated elements, the structure and operation of the shock absorber is similar to that shown in Patent No. 2,496,952, dated February 7, 1951.

The chambers B and C of the shock absorber are filled with oil and with the unit assembled, the reservoir A is charged with additional oil through open port 56 until the level of the oil in the reservoir reaches the top of tube 78 at which time oil will flow down the tube out of open port 76 to indicate that the reservoir is substantially half full. The ports 56 and 76 are then closed by the associated plugs 57, 77. The reservoir is only partially charged to accommodate the oil displaced when the piston 84 moves into sleeve 28.

In the use of the shock absorber the bushing 14 may be pivotally connected to the body or chassis of a vehicle and the bushing 32 may be pivotally connected to the supporting wheel construction of the vehicle.

Assuming that the wheel of the vehicle passes over a hole in the road, the inner casing 28 will move downwardly from the position shown in Fig. 1 causing the piston 81 to rise upwardly with respect to the sleeve 41 from the neutral position shown.

During the upward movement of the piston, the spring 115 becomes increasingly compressed, the spring pressure reacting against valve member 107 to retain the latter on rim 106 thereby preventing flow of fluid from chamber B into chamber C through passageways 104. As the piston moves upward it will move away from the lower spring 116 so that valve member 109 will only be retained against the rim 105 by the pressure of the coil spring 117. At maximum compression of spring 115, the spring 116 will rest entirely untensioned on the bottom of the chamber C.

The upward movement of the piston causes the displacement of hydraulic fluid from chamber B through the end 111 of passageway 103 to react against valve member 109 and when the pressure on the fluid is sufficiently great the force of spring 117 will be overcome so that such fluid will flow into chamber C. Thus, the transfer of fluid from chamber B to chamber C is only impeded substantially by the force exerted by coil spring 117, in addition to the flow resistance offered by the passageway 103, as well as to the flow resistance offered to the passage of a volume of fluid from reservoir A through passageways 52 and 53 in plug 31, equivalent to the diminishing displacement of the extending piston rod 84 as it moves through plug 34.

Such volume of fluid is drawn from the reservoir A by the suction created in chamber C by the upward movement of piston 81, this suction moving valve member 62 away from the adjacent end of passageway 53 to open the latter.

When the piston reaches its uppermost position it will thereupon reverse its direction of travel to move downwardly into sleeve 41. Consequently the pressure encountered by the piston will rise abruptly since the downflow passageways 103 will be closed by the fluid in chamber C retaining the valve member 109 against rim 105, as well as by the action of spring 117. That is, the retransfer of fluid through the passageways 104 from the underside of the piston to the upper side must now take place, if the piston is to descend, by overcoming the accumulated force exerted by compressed spring 115 which retains valve member 107 against rim 106 of passageways 104.

Consequently the rebound or downward return stroke of the piston is dampened or snubbed to the extent that the force of the spring 115 against valve member 107 is being overcome by the fluid being forced upwardly through passageways 104, as well as by some degree of resistance offered by the ball valve 66 in plug 31 at the bottom of the sleeve 41.

The ball valve 66 functions at this time to allow for the return of a volume of fluid to the reservoir A that is equivalent to the volume being displaced above the piston by the movement of the piston rod 84 into chamber B.

As the piston 81 returns from its topmost to its neutral position shown, the resistance offered by the valve member 107 to the upward re-transfer of fluid through passageways 104 decreases at the rate or substantially in proportion to the rate at which the force excited by spring 115 decreases with progressive extension thereof. Hence, the hydraulic resistance encountered by the piston on its rebound stroke decreases correspondingly as does the corresponding dampening or snubbing characteristic.

To complete the operating cycle of the shock absorber, assume that the wheel of the vehicle passes over a bump in the road which causes the inner casing 28 to move upwardly from the neutral position shown, causing the piston 81 to move downwardly with respect to the sleeve 41.

During the downward movement of the piston, the spring 116 becomes increasingly compressed, and reacts against valve member 109 to retain the latter against rim 105, thereby preventing flow of fluid through passageways 103 from chamber C to chamber B. As the piston moves downwardly it will move away from the upper spring 115 and at maximum compression of spring 116, the spring 115 will be entirely untensioned, resting on the valve member 107.

The downward movement of the piston 81 causes the displacement of fluid from chamber C through the end 112 of passageway 104 to react against the valve member 107 which will be moved away from rim 106 so that fluid will flow into chamber B. Thus, the transfer of fluid from chamber C into chamber B is substantially unimpeded or unsnubbed, the only resistance to the transfer being due to the flow resistance through passageway 104, in addition to whatever resistance may be offered by spring 73 acting against ball valve 66 to the flow into the reservoir A of a fluid volume equivalent to the volume being displaced by the piston rod 84 in chamber B.

As the piston on its shock initiated stroke moves down toward its lowermost position, the fluid will pass through the end 112 of passageway 104 and past the valve member 107. Simultaneously, the spring 116 will be compressed to its maximum compression at the lowermost point of piston travel whereby it exerts a corresponding force against the valve member 109 in preparation for the upward return or rebound stroke of the piston.

As the piston reverses its direction of travel to enter upon its snubbed or dampened upward return stroke, the pressure encountered by the piston 81 rises abruptly, as passageway 103 will be closed by the valve member 109 under the urging of springs 116 and 117 and passageway 104 will be closed by the valve member 107 due to the action of the fluid in chamber B thereagainst. Thus for fluid to be re-transferred from chamber C to chamber B the force of springs 116 and 117 against valve member 109 must be overcome. However, as the piston progresses upwardly toward the neutral position the force exerted by spring 116 will diminish substantially in proportion and in proportion therewith also diminishes the resistance offered to the re-transfer of fluid by valve member 109 from chamber C to chamber B. Thus, the snubbing action decreases substantially at the rate at which the piston approaches its neutral position.

In the construction shown in Patent No. 2,496,952, above referred to, in the event of a sudden extreme shock such as might occur if the shock absorber was mounted on a tank and the gun of the tank fired, as the piston moves downwardly quickly, insufficient fluid might flow through passageways 104 from chamber C to chamber B and past the ball valve 66 into the reservoir A, with the result that the pressure in chamber C might rise to such a value as to cause rupture of the unit. As a safeguard, the valve 124 is provided, which will open, in the illustrative embodiment shown, slightly before valve 66, to provide added flow of fluid from chamber C to chamber B to prevent excessive rise in pressure in chamber C.

It is to be noted that in the structure shown in Patent No. 2,496,952 effective shock absorbing or dampening action only occurs when there are relatively large movements of the piston for with only slight movements the force exerted by the coil springs 115 and 116 is relatively small. Consequently, if the shock absorber should be at a point of equilibrium, relatively small oscillations will not be effectively dampened, which is undesirable for objectionable vibrations of slight magnitude may be present.

Thus, in the embodiment shown, if there is a slight downward movement of the piston which might be caused by relatively slight irregularities in the road for example, flow of fluid will be effected through the open passageway 104. Upon return movement of the piston toward the neutral position shown, although the spring 116 will have little effect in retaining valve member 109 closed as it is substantially uncompressed, the spring 117 will exert substantially a constant force against the valve member 109 tending to keep it closed. As a result, the return movement of the piston even for relatively small oscillations will be effectively dampened.

If there should be an initial slight upward movement of the piston, the effect of spring 117 will tend to dampen such slight movement and when the piston 81 then moves downwardly, say slightly past neutral position, fluid will flow through passageways 104 and upon the subsequent slight upward movement of the piston, the effect of spring 117 will add further dampening action so that even slight oscillations will be rapidly damped.

It is apparent from the foregoing that the spring 117 quickly dampens oscillations around the neutral position of the shock absorber which are not otherwise taken care of by springs 115 and 116.

The spring 117 is also effective to prevent too rapid return of the piston 81 to neutral position in the event of a sudden large impact such as the firing of a gun which might cause large oscillations to occur.

Thus, if the gun of a tank, for example, should be fired, the piston 81 will move downwardly rapidly. Upon the return stroke of the piston 81 both the springs 116 and 117 acting against valve member 109 will tend to prevent flow through passageways 103 and the fluid in chamber B acting against valve member 107 will prevent flow through passageways 104. Consequently, the return stroke will be materially damped to prevent excessive oscillation.

The addition of the coil spring 117 to the shock absorber thus results in a unit that is highly effective in dampening both large and small oscillations and the addition of the valve 124 provides an added precaution to prevent rupture of the unit due to violent impact.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A shock absorber comprising an elongated casing closed at one end, a second elongated casing slidably mounted in said first casing and closed at its inner and outer ends, said second casing extending beyond said first casing, an elongated hollow member fixed in said second casing extending axially thereof and closed at its inner and outer ends, the space between said second casing and said elongated member defining a reservoir, a piston rod affixed at one end to the closed end of said first casing and extending axially through the closed inner ends of said second casing and said elongated member, a piston slidable in said elongated member, affixed to the free end of said piston rod and defining a chamber on each side thereof, said piston having a down flow and an up flow passageway therethrough providing communication between said chambers, valve means on each side of said piston associated respectively with said passageways to close the adjacent end of the latter, the other end of each of said passageways being open, resilient means in each of said chambers to react against the associated valve means, each of said resilient means being designed to apply substantially no force against the associated valve means during a portion of the stroke of the piston and to react against the associated valve means during another portion of the stroke of the piston, a normally closed one-way valve permitting flow of fluid in direction only from one of said chambers into the other, resilient means normally biasing said valve to said closed position, said valve opening only when the fluid pressure applied thereto exceeds a predetermined amount, a second one-way valve permitting flow of fluid in direction only from said first chamber into said reservoir, a third one-way valve permitting flow of fluid from said reservoir into said first chamber and additional resilient means reacting against the valve means on one side of the piston, said additional resilient means constantly exerting force against said valve means on one side of the piston.

2. The combination recited in claim 1 in which said additional resilient means reacts against the valve means associated with the downflow passageway.

3. A shock absorber comprising an elongated casing closed at one end, a second elongated casing slidably mounted in said first casing and closed at its inner and outer ends, said second casing extending beyond said first casing, an elongated hollow member fixed in said second casing extending axially thereof and closed at its inner and outer ends, the space between said second casing and said elongated member defining a reservoir, a piston rod affixed at one end to the closed end of said first casing and extending axially through the closed inner ends of said second casing and said elongated member, a piston slidable in said elongated member, affixed to the free end of said piston rod and defining a chamber on each side thereof, said piston having a downflow and an upflow passageway therethrough providing communication between said chambers, valve means on each side of said piston associated respectively with said passageways to close the adjacent end of the latter, the other end of each of said passageways being open, resilient means in each of said chambers to react against the associated valve means, each of said resilient means being designed to apply substantially no force against the associated valve means during a portion of the stroke of the piston and to react against the associated valve means during another portion of the stroke of the piston, a one-way valve permitting flow of fluid in direction only from said first chamber into said reservoir, a second one-way valve permitting flow of fluid from said reservoir into said first chamber and additional resilient means reacting against the valve means on one side of the piston, said additional resilient means constantly exerting force against said valve means on one side of the piston.

4. A shock absorber comprising an elongated casing closed at one end, a second elongated casing slidably mounted in said first casing and closed at its inner and outer ends, said second casing extending beyond said first casing, an elongated hollow member fixed in said second casing extending axially thereof and closed at its inner and outer ends, the space between said second casing and said elongated member defining a reservoir, a piston rod affixed at one end to the closed end of said first casing and extending axially through the closed inner ends of said second casing and said elongated member, a piston slidable in said elongated member, affixed to the free end of said piston rod and defining a chamber on each side thereof, said piston having a downflow and an upflow passageway therethrough providing communication between said chambers, valve means on each side of said piston associated respectively with said passageways to close the adjacent end of the latter, the other end of each of said passageways being open, resilient means in each of said chambers to react against the associated valve means, a normally closed one-way valve permitting flow of fluid in direction only from one of said chambers into the other, independently of the flow of fluid controlled by said valve means, resilient means normally biasing said valve to said closed position, said valve opening only when the fluid pressure applied thereto exceeds a predetermined amount, a second one-way valve permitting flow of fluid in direction only from said first chamber into said reservoir and a third one-way valve permitting flow of fluid from said reservoir into said first chamber.

5. The combination set forth in claim 4 in which resilient means are associated with said second one-way valve normally to retain the latter in closed position.

6. The combination set forth in claim 4 in which resilient means are associated with said second one-way valve normally to retain the latter in closed position and the force required to open the first normally closed valve against the tension exerted by its resilient means is less than that required to open the second valve against the tension of its resiilent means.

7. The combination set forth in claim 4 in which resilient means are associated with said second one-way valve normally to retain the latter in closed position and additional resilient means are provided constantly to exert force against the valve means associated with the downflow passageway.

8. The combination set forth in claim 4 in which said piston rod has an axial bore in its free end, with one end of the bore being in communication with one of said chambers, and a passageway leads into said bore from the other chamber, said first one-way valve controlling the flow of fluid through said bore.

9. The combination set forth in claim 8 in which said first one-way valve permits flow of fluid in direction from the chamber in communication with the end of the downflow passageway normally closed by the associated valve means into the other chamber.

10. The combination set forth in claim 4 in which said piston rod has an axial bore in its free end, a fitting is provided having a stem affixed in said bore, said fitting having a bore therethrough having its outer end in communication with one of said chambers, and its inner end defining the valve seat of said first one-way valve, said piston rod having a passageway leading into the bore thereof from the other chamber, said first one-way valve comprising a ball, the associated resilient means normally retaining said ball on said valve seat to prevent flow of fluid from said first chamber to the second chamber.

11. The combination set forth in claim 10 in which said fitting has an annular flange at the outer end thereof, and a coil spring encompassing said fitting is compressed between said flange and the valve means closing the downflow passageway.

12. The combination set forth in claim 1 in which the resilient means in each chamber, to react against the associated valve means, are springs of which the compression is a function of the piston position in the second elongated casing so that there is no substantial snubbing action during the movement of the piston from neutral position in either upward or downward direction and there is a snubbing action at a variable rate which decreases as a function of travel of the piston during its return stroke to neutral position.

13. A shock absorber comprising a reservoir, a hollow elongated casing closed at its ends, a piston rod extending through one of said ends into said hollow casing, a piston slidably mounted in said hollow casing and affixed to the end of the piston rod therein and defining a chamber on each side thereof, said piston having a down flow and an up flow passageway therethrough providing communication between said chambers, valve means on each side of said piston associated respectively with said passageways to close the adjacent end of the latter, the other end of each of said passageways being open, resilient means in each of said chambers to react against the associated valve means, each of said resilient means being designed to apply substantially no force against the associated valve means during a portion of the stroke of the piston and to react against the associated valve means during another portion of the stroke of the piston, at normally closed one-way valve permitting flow of fluid in direction only from one of said chambers into the other, independently of the flow of fluid controlled by said valve means, resilient means normally biasing said valve to said closed position, said valve opening only when the fluid pressure applied thereto exceeds a predetermined amount, a second one-way valve permitting flow of fluid in direction only from said first chamber into said reservoir, a third one-way valve permitting flow of fluid from said reservoir into said first chamber and additional resilient means reacting against the valve means on one side of the piston, said additional resilient means constantly exerting force against said valve means on one side of the piston.

References Cited in the file of this patent
UNITED STATES PATENTS

| | | |
|---|---|---|
| 2,040,063 | Padgett | May 5, 1936 |
| 2,394,355 | Beecher | Feb. 5, 1946 |
| 2,423,736 | Tack | July 8, 1947 |
| 2,496,952 | Mercier | Feb. 7, 1950 |
| 2,637,414 | Patriquin | May 5, 1953 |
| 2,653,681 | McIntyre | Sept. 29, 1953 |
| 2,653,682 | Whisler et al. | Sept. 29, 1953 |
| 2,724,590 | Irwin | Nov. 22, 1955 |